United States Patent [19]
Ng

[11] Patent Number: 5,743,076
[45] Date of Patent: Apr. 28, 1998

[54] ROTARY TYPE DEBRIS COLLECTOR

[76] Inventor: Kim Kwee Ng, PO Box 379, Selden Post Office, Selden, N.Y. 11784-0379

[21] Appl. No.: 707,864

[22] Filed: Sep. 9, 1996

Related U.S. Application Data

[63] Continuation-in-part of Ser. No. 526,587, Sep. 11, 1995, abandoned, and a continuation-in-part of Ser. No. 380,396, Jan. 30, 1995, abandoned.

[51] Int. Cl.⁶ .................................................. A01D 7/10
[52] U.S. Cl. ..................... 56/400.02; 56/400.08; 56/400.11
[58] Field of Search .................... 56/400.02, 364, 56/400.08, 400.09, 400.11, 400.14

[56] References Cited

U.S. PATENT DOCUMENTS

| | | | |
|---|---|---|---|
| 3,934,390 | 1/1976 | Ballard | 56/400.02 |
| 3,947,912 | 4/1976 | Michaels | 56/400.02 X |
| 4,974,406 | 12/1990 | Russ | 56/351 |

*Primary Examiner*—Terry Lee Melius

[57] ABSTRACT

The invention comprises an improvement in a lawn-cleaning device for picking up debris wherein flexible and deformable belts are used in an easily configurable compact structure whereby leaves and the like are pierced by spikes, tines or the like in repetitive motions of protrusion and retraction. Tines mounted on an inner belt protrude through spaced-apart suitably-shaped openings in an enclosing rotational member whereby debris is pierced for collection on the tines. Collected debris is automatically removed from the tines and collected in a debris receiver during retraction of the tines. The improvement comprises use of an inner belt provided with an array of outwardly-extending spaced-apart tines, constrained to move in a first pre-defined circuit within a second pre-defined circuit of an outer belt. The tines are adapted to retractible protrusion outwardly through spaced-apart openings in the outer belt, while both belts are moving in the same directional sense at the same linear speed, in an extended region where the inner belt and the outer belt are in contact.

6 Claims, 1 Drawing Sheet

ROTARY TYPE DEBRIS COLLECTOR

This application is a continuation-in-part of U.S. application Ser. No. 08/526,587 filed Sep. 11, 1995 and Ser. No. 08/380,396 filed Jan. 30, 1995, both now abandoned.

FIELD OF THE INVENTION

A collecting device used to clear debris off lawns and the like.

DESCRIPTION OF THE PRIOR ART

U.S. Pat. No. 5,274,989, entitled "Rotary rake-type leaf collector", teaches use of two rigid cylindrical elements on parallel rotational axes which cooperate during rotation to pick up and selectively release debris from lawns. Because of the use of rigid cylindrical elements, the leaf collector of that invention has the disadvantage of high profile that limits its use in certain areas. The use of rigid cylinders further limits the useful area of the device for piercing leaves from lawns and the like, since the tines are fully extended only along the line of tangency of the contacting cylinders. What is needed is an improved device having a lower profile, a larger and extended area for collection of debris, and a less costly and lighter weight construction. Ideally, an improved collector of the type desired should be flexible in design, permitting relocation of various elements in different configurations in embodiments where indicated by user consideration.

It is an object of this invention to provide an improved collector without the deficiencies of the collectors of the prior art and which substantially satisfies the desired criteria for continuous removal of debris, leaves and the like from lawns.

SUMMARY OF THE INVENTION

The invention embodies improved means for providing the continuous automatic protrusion and retraction of debris-piercing elements through openings to remove pierced debris as taught in the leaf collector invention of U.S. Pat. No. 5,274,989.

The invention comprises two belts, an inner belt and an outer belt. The inner belt has an array of spaced-apart tines on its outer surface. The outer belt has an array of spaced-apart through openings, adapted to the reciprocating through penetration by the spaced-apart tines. Both the inner belt and the outer belt are simultaneously driven and constrained to move in pre-defined closed paths in the same sense at the same linear speed with the inner belt having its tines directed towards the outer belt. The path of each belt is selected such that the belts are in substantial contacting engagement, during an extended portion of the circuit of each belt during which the tines penetrate the openings and pierce leaves and debris on the lawn surface being cleared. The circuits of the inner and the outer belts are such that after the tines pick up debris, the tines are gradually retracted through the openings upon further rotational translocation of each belt. Thus, by cooperative action of the two belts, the leaves pierced by the tines are pushed away from the openings when the tines are fully retracted. The debris removed from the tines is collected in a container for later disposal.

The belts in this invention are configured to have an extended area of contact with each other and with lawns and the like, in contrast to the debris collector of the prior art which collects debris in the limited region where the cylinders are in contact. The relative lengths of the inner belt and outer belt can be conveniently chosen to have almost any desirable dimensions, whereas, when cylinders are used, a fixed ratio between the dimensions of the inner and outer cylinders are dictated by the need to provide an integral multiple greater than one in the ratio of their dimensions.

DESCRIPTION OF THE PREFERRED EMBODIMENTS

Figure 1:
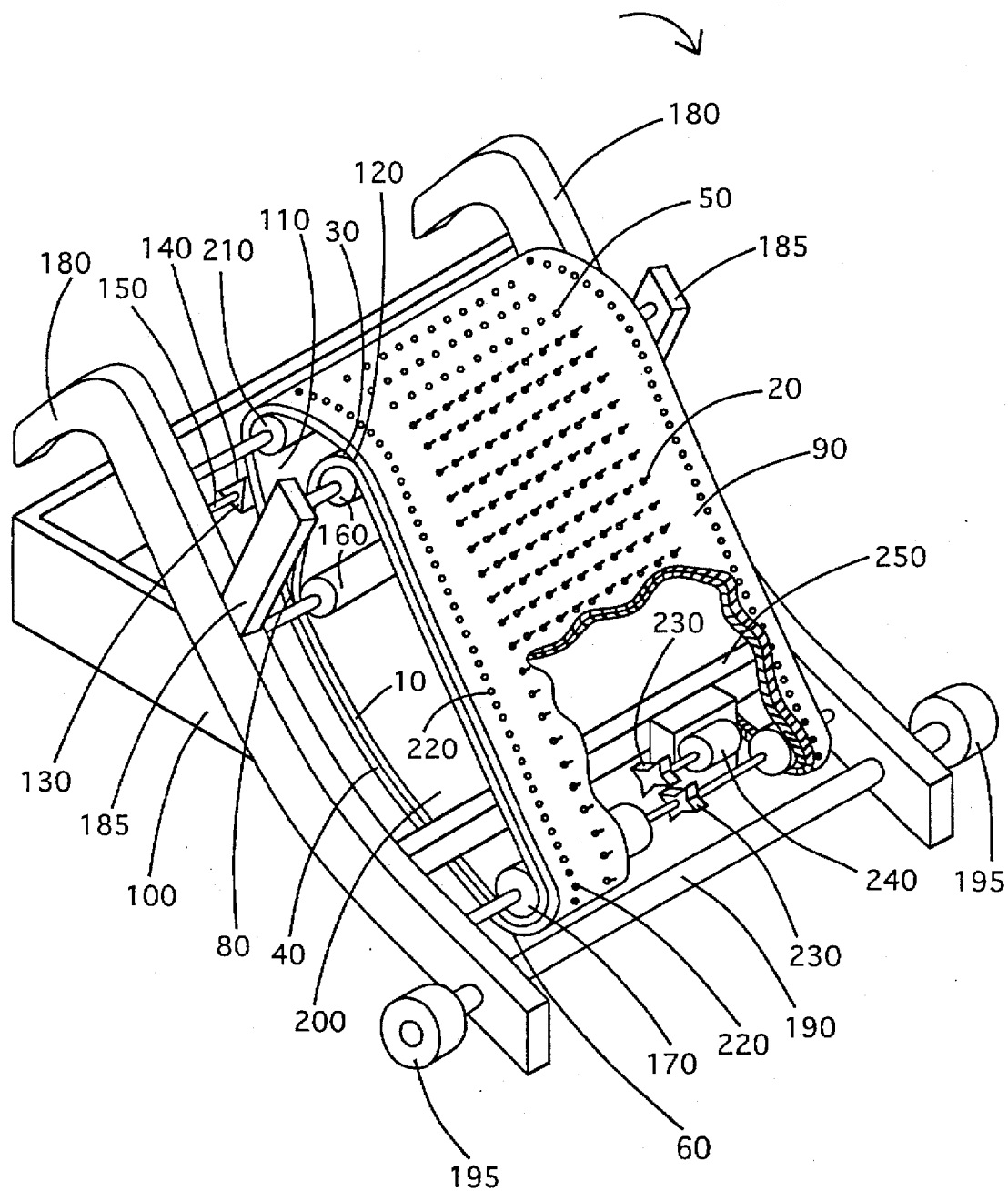
FIG. 1 is a simplified diagram of a preferred embodiment of the invention employing two belts.

A better and more complete understanding of the practice of my invention is provided by the following description and reference to the accompanying drawing, where like reference symbols define like elements of the invention.

In a preferred embodiment of my invention shown in FIG. 1, continuous flexible inner belt 10 supports an array of spaced-apart sharp tines 20, spaced in substantially parallel rows and tiers, outwardly extending from its outer surface 30, with a uniform longitudinal spacing between adjacent tiers of tines 20. Belt 10 is constrained to move within the circuit of flexible outer belt 40. Belt 40 contains an array of spaced-apart through openings 50, complementary to tines 20, which are adapted to the repetitive protrusion therethrough of tines 20 when the belts are rotated in the same directional sense. The array of spaced-apart tines 20 and the complementary array of spaced-apart through openings 50 are arranged such that the tines 20 match the openings 50 as the belts rotate at the same linear speed. To ensure a proper match of the openings and the tines through repetitive rotations of the belts, the difference in the lengths of inner belt 10 and outer belt 40 is equal to an integer multiple of the longitudinal spacing between the tines 20 in the direction along the circumference of the inner belt 10.

At locus 60, tines 20 extend outwardly through openings 50 in position to pierce debris on the ground. Debris pierced by tines 20 and held thereon is transported to locus 80 where it is pushed away from tines 20 by interaction with the outer surface 90 of belt 40, as belt 10 and belt 40 disengage at the elevated position, locus 80, causing tines 20 to retract through openings 50 allowing debris to fall into debris receiver 100, suitably positioned with reference to locus 80. Inner belt 10 and outer belt 40 are in substantial contacting engagement with outer surface 30 of inner belt 10 in contact with inner surface 110 of outer belt 40 during rotation in the rotational direction of the arrow from locus 120 to locus 80, both belts are rotational in a clockwise sense for debris collection.

Intercepter 130, with edge member 140, mounted on bracket 150, positioned in surface-wiping contacting relationship with outer surface 90 of outer belt 40, is provided to remove any debris tending to adhere to surface 90 of outer belt 40.

A pair of rollers, 160 and a cog-wheel 170, suitably supported by a long handle 180 with a supporting arm 185 and journaled to an axle 190 of a pair of wheels 195, is positioned so that rollers 160 and the cog-wheel 170 contact inner surface 200 of belt 10 and define the circuit of belt 10. The shape of the the circuit of belt 40 is defined by a cog-wheel 210 supported by handle 180, contacting inner surface 110 of belt 40 to define the apex of its circuit and by contacting engagement between outer surface 30 of belt 10 and inner surface 110 of belt 40 to define the remainder of the circuit.

The cog-wheel 170 having protruding teeth distributed evenly near its outboard rim drives both belt 10 and belt 40 by reciprocating in and out of a plurality of through openings 220 suitably spaced along the edges of both belt 10 and belt 40. Cog-wheel 170 is rotated by a motorized means comprised of a set of gears 230 and a motor means 240, supported by bracket 250, as shown in the exposed sectional view of FIG. 1.

A control handle means (not shown) with appropriate mechanical drive means for selective elevation, as is well known in the art, can be used to adjust the vertical position of the belt mechanisms relative to the ground, so that the belts can be selectively positioned as desired to accommodate different terrain conditions.

Having described the invention and its preferred modes of operation in sufficient detail for those of normal skill in the art to practice the same, it will be obvious to such practitioners to make certain changes and variation in the specific elements of the disclosed embodiment without departing from the scope of the invention. For example, a belt may have a circuit other than the one described, and the rotation could be in an opposite directional sense without departing from the teaching of the invention. A belt may include reinforcing means to enhance the stiffness and durability of the belts. A belt may comprise articulating planar elements having hardened sections and flexible sections interconnected by linkages permitting limited relative rotation around a transverse horizontal rotational axis. Although the intercepter has been illustrated in the drawings accompanying this specification as having an edge in wiping contact with the outer surface of the outer belt, it will be obvious to those of normal skill in the art to substitute brushes, rakes or the like. It is also obvious that the outer surface of the outer belt in FIG. 1 need not necessarily have a smooth surface. A rough outer surface could help in preventing debris from slipping down the outer belt after the debris is being pushed away from the tines and before it is released into the debris receiver, when the debris is transported near the peak of the circuits of the belts in FIG. 1. A plurality of rakes and other restraining and trapping material whose size is small compared with the protruding length of the tines could be mounted on the exterior surface of the outer belt to deter debris from movement down the outer belt. It is clear that the belts of the debris collector of FIG. 1 could rotate without the aid of the motorized means 240 and the wheels 195 of FIG. 1, the tines 20 can interact with the terrain at locus 60 when the debris collector is moved across the lawn, causing belt 10 and belt 40 to revolve in the clockwise direction as the debris collector is translocated in the direction forward from debris receiver 100. For these reasons, the scope of the invention should not be limited by that which has been illustrated herein but should be limited only by the scope of the appended claims:

I claim:

1. A device of the type for picking up debris from lawns and the like, in combination with a wheeled means defining a frame, comprising:

a) first means defining a rotational flexible first belt mounting an array of uniformly spaced-apart tines extending outwardly from said rotational flexible first belt; and, b) second means defining a rotational flexible second belt exterior to said first means, said second belt having an array of spaced-apart transverse through openings adapted for through penetration by said tines, said first means and said second means cooperatively interacting to pick up said debris, comprising paper, leaves and the like, on said tines while said tines protrude through said openings and to remove said debris from said tines during selective retraction of said tines.

2. The invention of claim 1, wherein said device comprises means for defining a receiver for said debris.

3. The invention of claim 1, wherein said device comprises means for defining an intercepter for removing any said debris tending to adhere to said second means.

4. The invention of claim 1, wherein said device includes a powered drive means for driving at least a one of said first and second belt.

5. The invention of claim 1, wherein said device includes a plurality of cog-wheels for rotational engagement with said first belt.

6. A device of the type for picking up debris from lawns and the like, in combination with a wheeled means defining a frame, comprising:

a) first means defining a rotational flexible first belt mounting an array of uniformly spaced-apart tines extending outwardly from said rotational flexible first belt;

b) second means defining a rotational flexible second belt exterior to said first means, said second belt having an array of spaced-apart transverse through openings adapted for through penetration by said tines, said first means and said second means cooperatively interacting to pick up said debris, comprising paper, leaves and the like, on said tines while said tines protrude through said openings and to remove said debris from said tines during selective retraction of said tines;

c) means for defining a receiver for said debris; and, d) means for defining a powered drive means for driving at least a one of said first and second belt.

* * * * *